Figure 1:
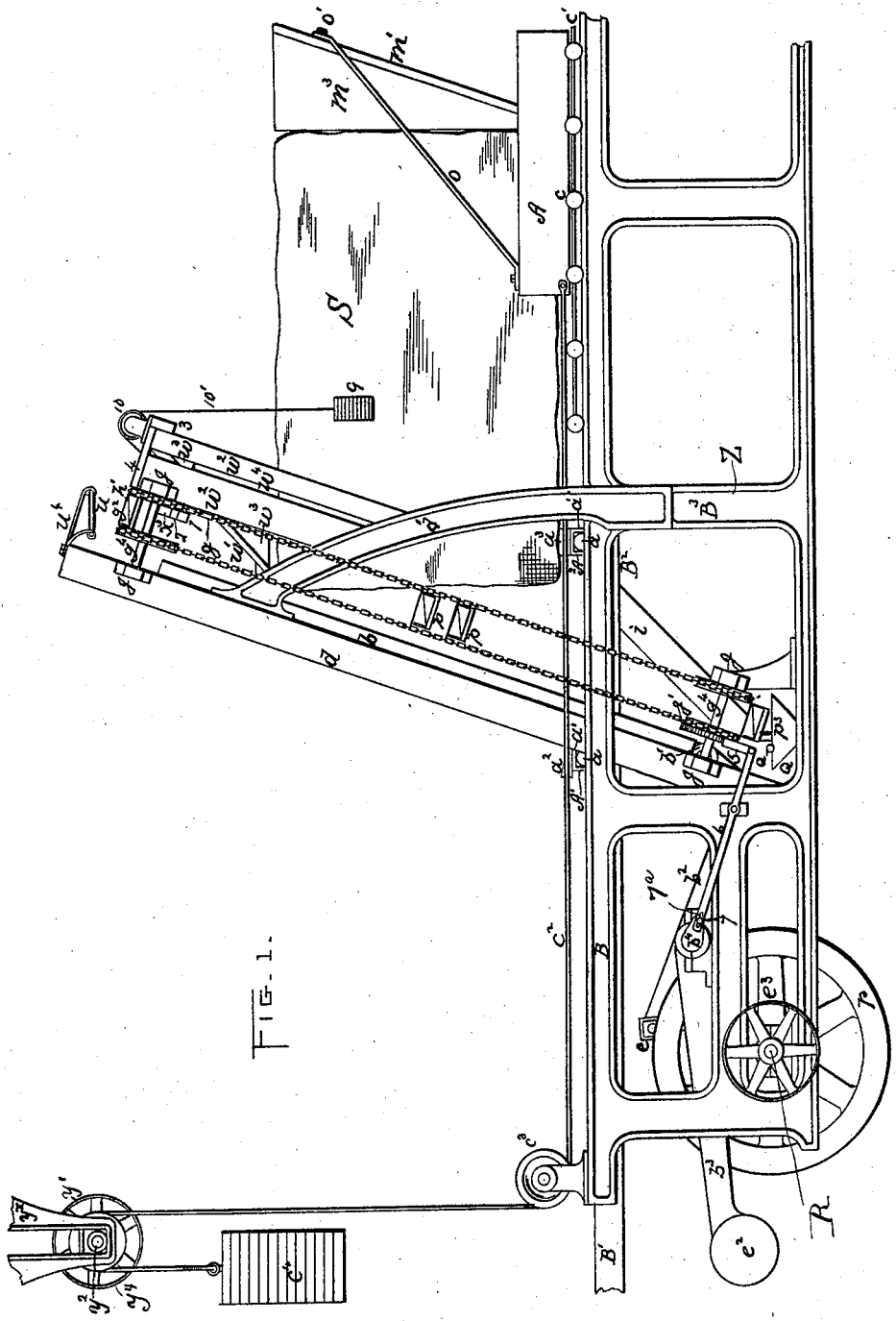

(No Model.) 5 Sheets—Sheet 1.

J. PECKOVER.
STONE SAWING MACHINE.

No. 578,116. Patented Mar. 2, 1897.

Witnesses
Rebecca O'Brien
Carrie O'Brien

Inventor
James Peckover (No Model.) 5 Sheets—Sheet 2.
J. PECKOVER.
STONE SAWING MACHINE.
No. 578,116. Patented Mar. 2, 1897.
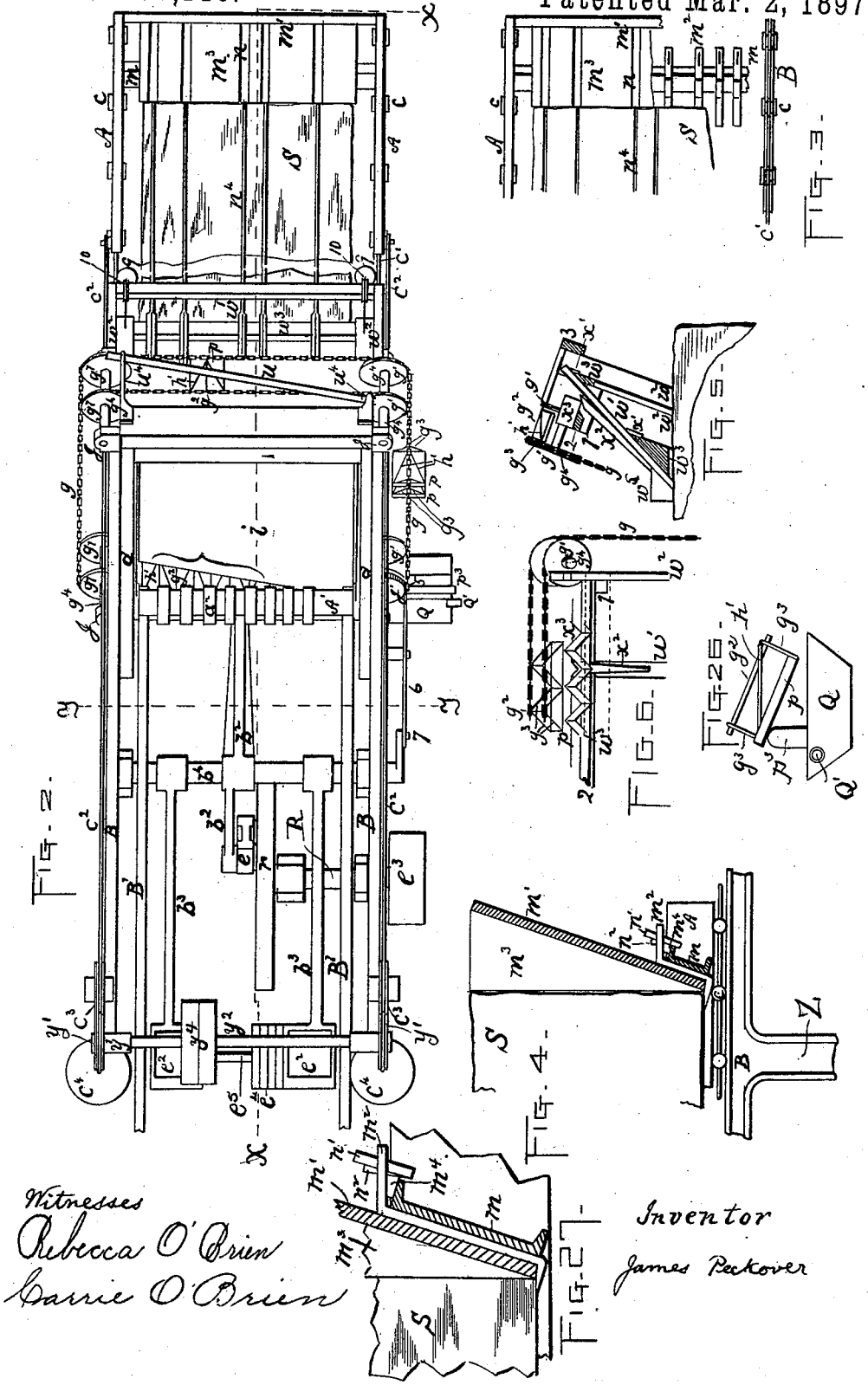
Witnesses
Rebecca O'Brien
Carrie O'Brien
Inventor
James Peckover (No Model.) 5 Sheets—Sheet 3.
J. PECKOVER.
STONE SAWING MACHINE.
No. 578,116. Patented Mar. 2, 1897.
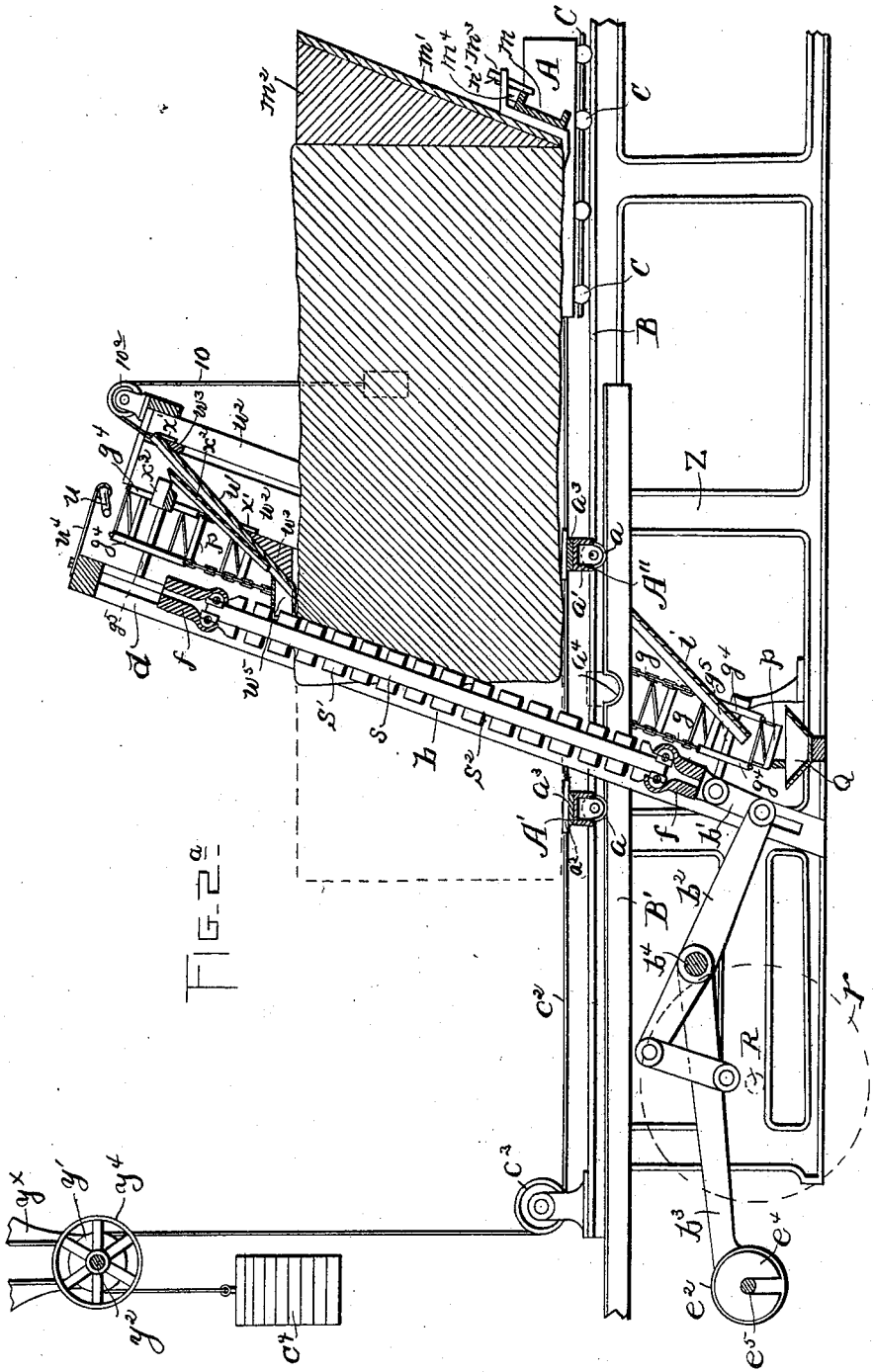
Witnesses
Carroll J. Webster
Philip B. Masi.
Inventor
James Peckover
by Geo. H. Parmelee.
Asso. Attorney (No Model.) 5 Sheets—Sheet 4.
J. PECKOVER.
STONE SAWING MACHINE.
No. 578,116. Patented Mar. 2, 1897.
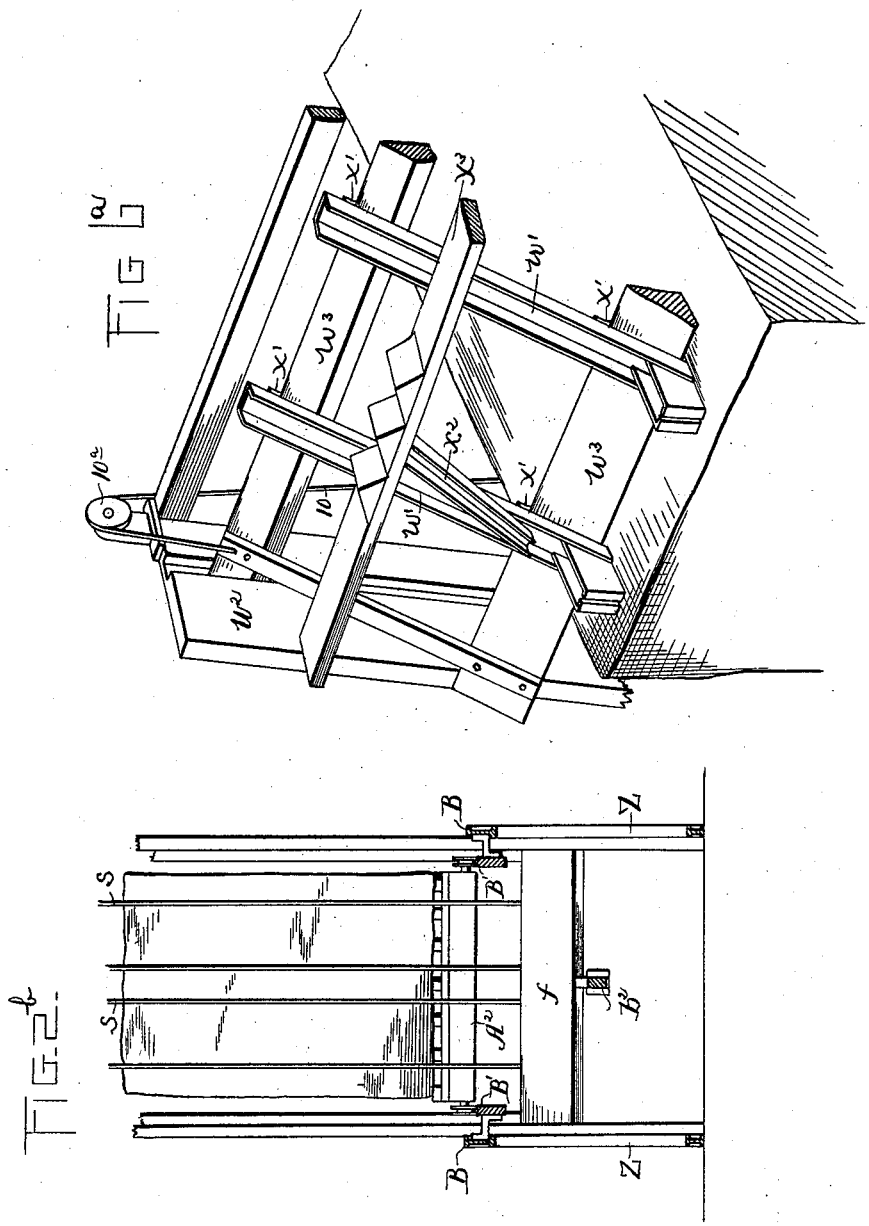
WITNESSES:
Carroll J. Webster
Philip C. Masi
INVENTOR
James Peckover.
BY
Geo. H. Parmelee,
Asso. ATTORNEY.

(No Model.)
J. PECKOVER.
STONE SAWING MACHINE.
No. 578,116. Patented Mar. 2, 1897.
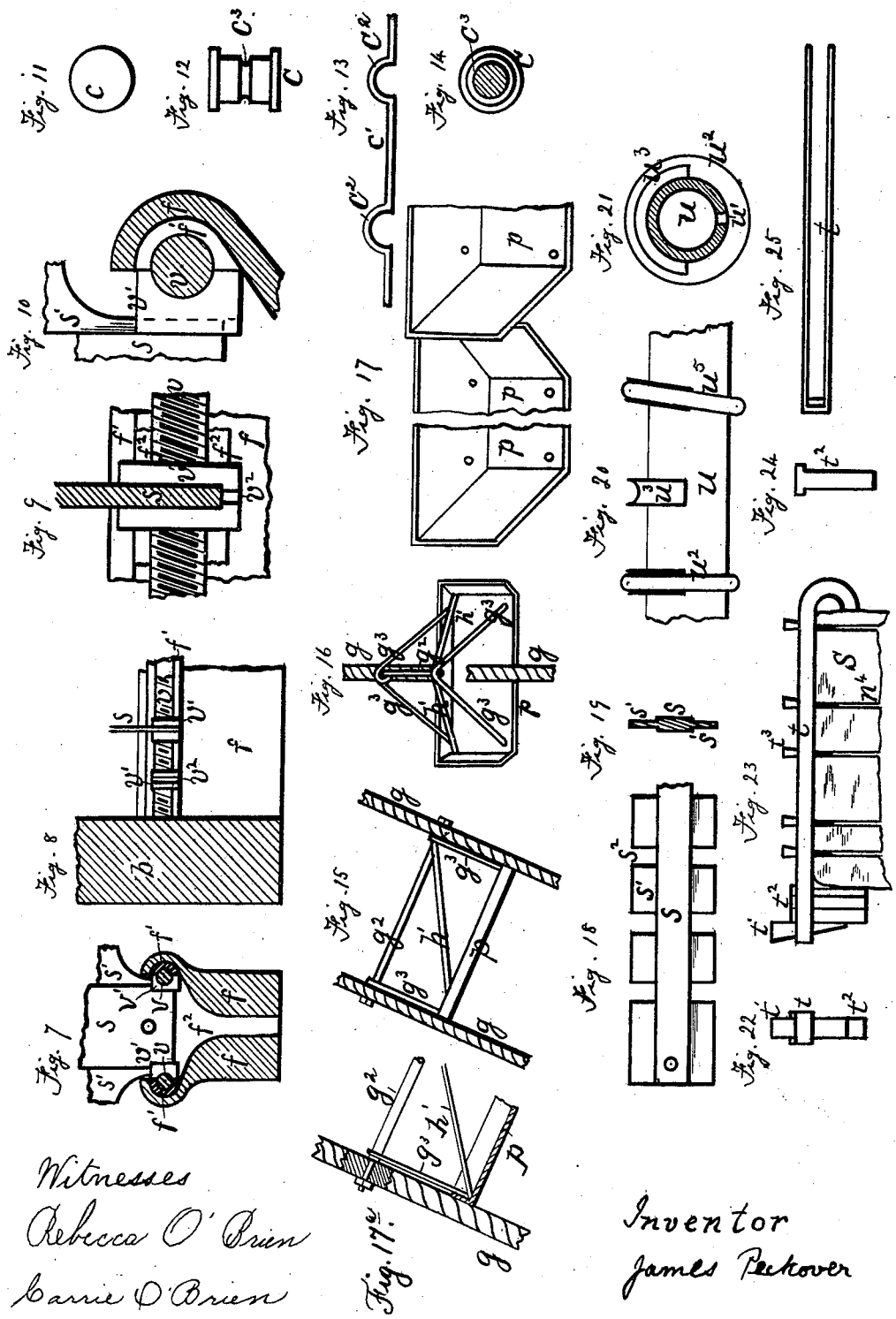
Witnesses
Rebecca O'Brien
Carrie O'Brien
Inventor
James Peckover

UNITED STATES PATENT OFFICE.

JAMES PECKOVER, OF PHILADELPHIA, PENNSYLVANIA, ASSIGNOR, BY MESNE ASSIGNMENTS, TO THE RAPID STONE SAW COMPANY, OF NEW JERSEY.

STONE-SAWING MACHINE.

SPECIFICATION forming part of Letters Patent No. 578,116, dated March 2, 1897.

Application filed March 13, 1896. Serial No. 583,027. (No model.)

*To all whom it may concern:*

Be it known that I, JAMES PECKOVER, a citizen of the United States, residing at Philadelphia, in the county of Philadelphia and State of Pennsylvania, have invented certain new and useful Improvements in Stone-Sawing Machines; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

The principal objects of my invention are, first, to provide means for supporting the stone and feeding the same while it is being sawed in a steady, uniform manner, such as to insure sawed surfaces of straight and even character; second, to balance the saw-frame in such a manner that the power required to operate it shall be uniform during both the up and down strokes of the saw, and also to provide means whereby such balance may be adjusted to compensate for the use of a greater or less number of saws in the frame; third, to secure certain and uniform pressure of the stone against the saws and regulate the rate or speed of sawing to the character of the stone operated upon; fourth, to provide ready, efficient, and convenient means for spacing, setting, and securing the saws in their frame; fifth, to provide means for collecting the abrading material discharged from the saws and for returning the same for reuse; sixth, to provide means for supplying the saws with abrading material at the rear end portion of the stone; seventh, to maintain the sawed slabs in their true positions as long as may be desired; eighth, to secure effectiveness and economy in the saws, and, ninth, to provide improved means for regulating the water-supply.

Other minor objects of the invention will hereinafter appear.

With these objects in view the invention consists in the novel construction and combination of parts, all as hereinafter described, and pointed out in the appended claims.

In the accompanying drawings, Figure 1 is a side elevation of a machine embodying my invention. Fig. 2 is a plan view of the same. Fig. 2$^a$ is a longitudinal vertical section on the line $x\ x$, Fig. 2. Fig. 2$^b$ is a transverse section on the line $y\ y$, Fig. 2. Fig. 3 is a plan view, partly broken away, of the rear portion of the machine with a stone thereon. Fig. 4 is a side elevation of the same, partly in section. Figs. 5, 6, and 6$^a$ are detail views showing the means by which the abrading material is distributed and fed to the saws. Figs. 7, 8, 9, and 10 are detail views showing the manner in which the saws are held and secured in the saw-frame. Figs. 11, 12, and 14 are detail views of one of the rollers of the rear car. Fig. 13 is a detail view showing the manner in which said rollers are maintained in their proper relative positions. Figs. 15, 16, 17, and 17$^a$ are detail views showing the construction and arrangement of the buckets. Figs. 18 and 19 are side and sectional views, respectively, of one of the saws. Figs. 20 and 21 are detail views of the water-supply pipe. Figs. 22, 23, and 25 are detail views of the stone-clamp. Fig. 24 is a view of one of the blocks which are used in connection with said clamp. Fig. 26 is a detail view showing the means for adjusting the buckets. Fig. 27 is a detail view showing the manner in which the dogs which secure the rear portion of the stone are held.

In the drawings the letter Z designates the frame of the machine.

B B designate a pair of rails which extend longitudinally of the said frame and constitute a trackway.

B' B' designate a second pair of rails which are located between the rails B and at a lower level and constitute a second trackway.

A designates a car or carriage which is adapted to travel on the rails B, being mounted on rollers C. These rollers are flanged at both ends (see Fig. 12) to maintain their true positions on the rails and are held in their proper relative positions with respect to each other by means of longitudinal retaining-rods C', which have semicircular portions C$^2$, fitted to engage central grooves C$^3$ of the rollers. (See Fig. 13.)

A' A$^2$ designate two cars or carriages which are mounted to travel on the lower rails B'. These cars being shorter than the rear car A, the latter can readily pass by and over the car A² while delivering the stone to the car A'. Said cars A' A² comprise a frame or body portion a' and rollers a, upon which they are mounted.

a³, Fig. 1, designates removable blocks, which are placed on the car A² to support the stone S at the proper height. The rails B', at the end portions thereof nearest the saws, are formed with depressions a⁴, for the purpose of receiving therein the rollers a of the car A² as soon as the latter has delivered the stone to the car A' and thereby permit the latter to drop and release the blocks a³, which are then removed out of the way of the oncoming rear car A. The middle car A² is placed far enough under the stone to land the front end portion of the latter upon the front car A'.

Connected to the respective sides of the car A are two cables $c^2$, which extend to the front end portion of the machine, where they pass under pulleys $c^3$ and thence up and over pulleys $y'$, mounted on a shaft $y^2$, which is journaled over the machine in suitable hangers $y^\times$. Connected to the free ends of the said cables are adjustable weights $c^4$. On the shaft $y^2$ is a fast and loose pulley $y^4$, which is designed to receive a belt from any suitable source of power to impart motion to said shaft and thereby assist the said weights in causing the forward movement of the car A with its load. In this manner the stone is caused to exert a certain and uniform pressure upon the saws and the speed of sawing is regulated to the particular character of the stone, since if a speed is imparted to the said shaft somewhat faster than the stone can be sawed the cables will slip on their pulleys. The rails B and B' are preferably somewhat inclined to also assist the feed, so that the weights $c^4$ may be comparatively light, especially when they are assisted by the driving-belt, as above described.

b is the reciprocating saw-frame, which is mounted in suitable guides d to move in an inclined plane, as shown.

R designates a driving-shaft having a driving-pulley $e^3$ and a balance-wheel r. The latter is operatively connected with the saw-frame through the medium of the crank-link e, the lever $b^2$, and the link $b'$. The said lever is rigidly sleeved on a rock-shaft $b^4$, Figs. 2 and 2ª, and connected to said shaft are two counterweighted arms $b^3$, whose weights $e^2$ and $e^4$ are adjustable on a connecting-rod $e^5$, Fig. 2. By means of these counterweights the saw-frame may be accurately balanced and the power required to operate the same rendered constant during both the up and down strokes. The weights can also be adjusted to compensate for the use of a greater or less number of saws.

The end portions f of the saw-frame are vertically split or slotted, as indicated at $f^2$, and the slots thereof are provided at their enlarged upper portions with opposite offset recesses $f'$, Fig. 7, which extend the length of said end portions. Each of these recesses is fitted with a hard-rubber or other suitable packing $f^4$. Seated in this packing in each groove to the extent of nearly one-half its diameter is a threaded rod v, which extends across the saw-frame. Half-nuts $v'$, Figs. 7, 8, 9, and 10, grooved on one side, as indicated at $v^2$, are fitted to engage the said rods and to receive and hold the saws s in the manner best shown in Fig. 9. These nuts may be placed anywhere on the said rods to suit the requisite spacing and setting of the saws and serve to lock the latter rigidly but removably in their respective positions.

I will now proceed to describe the means which I employ for collecting the abrading material discharged from the saws and for returning and distributing the same for reuse.

g g designate two endless conveyer-bands, which may be chains, such as shown in Figs. 1, 2, 2ª, 2ᵇ, 5, and 6, or ropes, such as shown in Figs. 15, 16, and 17ª. These bands extend up one side of the frame in a direction parallel with the saw-frame and outside the rails B, thence across the top of the machine over the stone on the carriage, thence down on the opposite side and across through the lower portion of the frame. They are carried by pulleys $g^4$, which are mounted upon obliquely-journaled shafts $g^5$, the rear pulley of each shaft being in a lower plane than the front one. On one of the lower of said shafts is a ratchet-wheel $g'$, which is engaged by a pawl 5 on one arm of a lever 6, said lever being connected to a crank-pin 7 on the rock-shaft $b^4$, above referred to. By this means the bands are kept in motion, the pin 7 being adjustable to vary the throw of said lever and regulate the speed of the movement of said bands.

Suspended from cross-rods $g^2$, which connect the two bands at suitable intervals, are collecting plates or buckets p, which consist each, in the form illustrated, of a piece of metal bent up on three sides, as best shown in Figs. 17 and 17ª, the fourth or lowest side or end being open. These buckets are suspended by means of the wires $g^3$, and are braced and held by rods $h'$, which are secured to the front end portions of the rods $g^2$ and are spread into the opposite corners of the buckets. The contiguous edges of adjacent buckets are made to overlap, as shown in Fig. 17, in order that the abrading material may not escape between them. In Figs. 1 and 2 I have, for greater clearness of illustration, shown but a few of these buckets in place, but it will be understood that they form a continuous series. The degree of their inclination where they make their collections may be adjusted by means of a transverse bar $p^3$, Figs. 1 and 6ª, which may be moved forward and back to vary the degree of their contact therewith, and whereby they are tipped to a greater or less extent. After passing this bar the buckets return to their normal positions.

Q designates a trough or receptacle which is placed underneath the lower transverse portion of the said conveyer for the purpose of catching any abrading material which may escape the buckets. Q' is an overflow-pipe for said trough.

$i$ is a forwardly and downwardly inclined plate which is the full width of the widest stone that may be sawed upon the machine. The lower forward edge of said plate extends diagonally over the line of buckets which pass underneath it, as shown in Fig. 2. The material discharged from the kerfs from the saws falls down on this plate and off onto the moving buckets and is by them carried upward for reuse in the manner presently described. Owing to the diagonal arrangement of the edge of this plate with respect to the buckets the latter receive a more or less uniform discharge therefrom.

Secured to arms $d'$ of the frame of the machine, upon each side of the machine and parallel with the saw-frame, are slotted pieces or arms $w^2$, the slots and front edges of which form guides for two transverse bars $w^3$. These bars are fitted to move easily in the said guides and are balanced and adjusted therein to stones of different heights by means of light cables 10, attached thereto and passing up over pulleys $10^a$, their free ends being provided with counterweights 9. The two bars $w^3$ are connected together to maintain their relative positions. Removably secured to the said bars by means of hooks $x'$ is a series of inclined channels or troughs $w'$, having receivers $w^5$ at their lower ends which are adapted in operation to rest upon the stone and which are sufficiently open at their front sides to admit the saws to play therethrough. They are placed directly in front of the saws.

Secured to the boards $w^2$ are brackets 1, which support a transverse removable shelf 2, having thereon a series of pockets $x^3$ of equal size and adapted to receive therein the abrading material as it is discharged from the buckets $p$ of the endless conveyer. There must be one of these pockets for each of the saws, and it is therefore necessary to provide each machine with a number of interchangeable shelves, each of which has a different number of pockets. $x^2$ designates a series of channels which extend from the bottoms of the said pockets into the channels $w'$, being loosely connected to the pockets, so that in the event of a pocket not being directly over its corresponding channel $w'$ the channel $x^2$ may be moved to make the necessary connection.

$u$ is a water-pipe which extends diagonally over the upper line of the buckets $p$ above the stone, being supported by suitable brackets $u^4$ and provided on its under side with a series of discharge-openings $u'$. The water discharged from this pipe falls upon the buckets $p$ and washes the abrading material therefrom into the pockets $x^3$. By reason of the diagonal position of said pipe with relation to the line of buckets the material is first washed from the rear portions of the latter, and as each moves on the water falls farther and farther forward upon the same and the material is gradually washed from successive portions thereof into the said pockets, which are thus insured an approximately equal supply. Said water-pipe is fitted with grooved metal shields, one of which is placed upon the pipe opposite to each of the discharge-openings. Rubber bands $u^2$ are held in said shields around the pipe to close the said openings, and when it is desired to uncover any opening its band is moved to one side, as indicated at $u^5$ in Fig. 21.

In order to supply abrading material to the saws at the rear portion of the stone, a slab $m'$ (see Figs. 1 and 4) is provided on the car A, said slab being set parallel with the saw-frame and extending the full height of the stone. Wedge-shaped blocks $m^2$, Figs. 1, 2, 3, and 4, are fitted between said slab and the rear end of the stone in such a manner as to leave between them a series of narrow spaces $n$ directly in line with the saws. These spaces are filled with abrading material, and the saws on entering the same feed themselves, aided by the supply from the channels above described, until the stone is sawed through.

The stone is held in place on the car A by means of a series of dogs $m^3$, Figs. 3 and 4, which are placed between the slab $m'$ and the rear end $m$ of the car, the latter being inclined and parallel with the saw-frame. In order to adjust said dogs properly to the stone, wedges $m^4$, Fig. 4, are employed and are held in place by keys $n'$, which are secured in turn by wedges $n^2$. There should be one or more of these dogs for each slab to be sawed, and care must be taken not to place them in the path of the saws.

In Figs. 18 and 19 I have shown one of the saws which I prefer to employ. This saw consists of a plate having a central portion of some thickness with a thinner portion $S'$ upon each side thereof. Each of these thinner portions is notched, as at $S^2$, thereby forming the plate into a double saw.

In operation, when the stone has reached a point well over the car A' each of the sawed slabs is wedged up in true position, wedges $a^2$ being provided for the purpose. A small wedge (not shown) is also driven into each kerf at the front end of the stone immediately above the wedges $a^2$. When the stone is sawed about half-way through, a slotted clamp $t$, Figs. 23 and 24, is placed transversely across the stone. This clamp has a hook portion at one end which is engaged with one side of the stone, as shown in Fig. 23. The space between the stone and the wall of the slot at the other end is filled in with blocks $t^2$, secured by a key or wedge $t'$.

A small wedge $t^3$ is also driven into the upper portion of each kerf, but not too hard. The car $A^2$ is at this time out of the way by reason of its rollers resting in the depressions $a^4$, before described, and the cars A and A' carry the stone along smoothly and steadily until it is sawed through.

Having thus described my invention, what I claim as new, and desire to secure by Letters Patent, is—

1. In a stone-sawing machine, the combination with the two trackways of different height and width, the lower and narrower of said ways being between the rails of the higher and wider one, of the middle and front cars arranged to travel on said lower and narrower way, and a rear car mounted to travel on the higher of said ways and adapted to pass over and by the said middle car, substantially as described.

2. In a stone-sawing machine, the combination with a frame having two trackways of different height and width, of front and middle cars arranged to travel on the lower and narrower of said ways, a rear car mounted to travel on the higher and wider trackway and adapted to pass said middle car, cables attached to said rear car, bearings for said cables, and counterweights attached to the cables, substantially as specified.

3. In a stone-sawing machine, the combination with the two trackways of different height and width, and with the front and middle cars arranged to travel on the lower and narrower of said ways, of a rear car mounted to travel on the higher and wider trackway and adapted to pass the said middle car, a cable attached to said rear car, a rotary shaft having a bearing over which the said cable passes, a weight or weights attached to the free end of the said cable, and means whereby power may be applied to said shaft independently of the said weights, substantially as specified.

4. In a stone-sawing machine, the frame having the two trackways of different height and width, the front, middle and rear cars, the rear car being mounted on the higher and wider of said trackways and the front and middle cars upon the lower one, the rails of said lower trackway having depressions therein to receive the rollers of the middle car, adjustable dogs for securing the stone to the said rear car, and fastening devices for said dogs, substantially as specified.

5. In a stone-sawing machine, the combination of the reciprocating saw-frame, the driving-shaft, the rock-shaft journaled intermediately of the driving-shaft and the saw-frame, the lever attached to said shaft and operatively connected at one end to the driving-shaft and at the other end to the saw-frame, and a counterweight applied to said rock-shaft and acting through the same and through the said lever to balance the saw-frame, substantially as specified.

6. In a stone-sawing machine, the combination of the reciprocating saw-frame, the driving-shaft, its balance-wheel, the rock-shaft, the lever attached to said shaft and operatively connected to both the balance-wheel and the saw-frame, the arms or rods also connected to said rock-shaft, and the adjustable weights carried thereby, substantially as specified.

7. In a stone-sawing machine, the combination with the rear car having the inclined rear end portion, of the parallel slab $m'$ in front of said end wall, the series of stone-holding dogs adapted to be held between said slab and end wall, and means for adjusting and securing the said dogs, substantially as specified.

8. In a stone-sawing machine, an endless carrier arranged to travel around the stone and having a series of plates or buckets arranged to receive the abrading material discharged from the saws and to convey the same back for reuse, said plates or buckets having inclined bottom portions and open at their lowest sides, substantially as specified.

9. In a stone-sawing machine, the combination with the pair of endless bands, the obliquely-journaled shafts which carry the same, and means for imparting motion thereto, of a series of buckets suspended from said bands and arranged to receive the abrading material discharged from the saws and to carry the same above the stone for reuse, together with means for causing the gradual discharge of the material from said buckets at the proper time, substantially as specified.

10. In a stone-sawing machine, the combination with a pair of endless bands, the obliquely-journaled shafts which carry the same, and means for imparting motion thereto, of a series of buckets suspended from said bands and arranged to receive the abrading material discharged by the saws and to discharge the same above the stone for reuse, of means for adjusting the inclination of said buckets during a portion of their travel, substantially as specified.

11. In a stone-sawing machine, the combination with a stone carrying and supporting car, of an endless carrier arranged to travel around the stone on the car, a series of buckets suspended from said carrier and open at their lowest sides, an inclined plate arranged to convey the abrading material discharged from the saws to the buckets at the lower transverse portion of the said carrier, said plate having its lower edge extending diagonally across the line of said buckets, and means for causing the discharge of the material from said buckets at points above the stone, substantially as specified.

12. The combination with a stone-carrying car, of an endless carrier arranged to travel around the stone when on said car, said carrier having a series of buckets, a plate arranged to convey the abrading material discharged from the saws to the lower line of said buckets, a tank or receptacle below such line of buckets, and means for causing the discharge of the material from said buckets at points above the stone, substantially as specified.

13. In a stone-sawing machine, the combination with an endless carrier having a series of buckets arranged to collect the abrading material discharged from the saws, and to convey the same back over the stone, said buckets being arranged to discharge at one side, of a water-pipe extending diagonally above the upper line of said buckets and arranged to discharge water thereon, substantially as specified.

14. In a stone-sawing machine, the combination with an endless carrier having a series of buckets arranged to collect the abrading material discharged from the saws and to carry the same to points above the stone, said buckets being arranged to discharge at one side thereof, of a water-pipe above the upper line of buckets and having discharge-openings in its lower side, a series of shields $n^3$, fitted to said pipe and a series of rubber bands held in said shields and adapted to close the said discharge-openings, substantially as specified.

15. In a stone-sawing machine, the combination with the endless carrier having the buckets arranged to discharge abrading material at points above the stone, of a water-pipe having discharge-openings in its under side, and arranged to discharge water upon the said buckets, and movable bands held on said pipe and operating to control the said openings, substantially as specified.

16. In a stone-sawing machine, the vertically-movable frame above the stone, guides in which said frame is supported to move in a plane parallel with the saw-frame, a series of channels or troughs supported on said frame and having each a receiver adapted to rest on the stone, said receivers having openings at one side to permit the saws to play therethrough, and counterbalancing-weights applied to said frame, substantially as specified.

17. The combination, in a stone-sawing machine, with means for supplying abrading material to the saws, of a series of receivers for such material, said receivers being open at one side to permit the saws to play therethrough and means for vertically adjusting the said receivers, substantially as specified.

18. The combination with the endless carrier having a series of endless buckets arranged to discharge abrading material at points above the stone, of a series of pockets arranged to receive the material discharged from the said buckets, a series of conducting-channels movably connected to the said pockets, a second series of channels into which the first-named series are arranged to discharge, and receivers which catch the material from said channels and supply it to the saws, substantially as specified.

19. The combination with a horizontally-movable car A, and with the saw-frame mounted to reciprocate in an inclined plane, of the slab $m'$ at the rear portion of said car and parallel with the saw-frame, a series of wedge-shaped blocks adapted to fit between the said slab and the rear end of the stone on the car to form narrow spaces between them for the reception of abrading material, substantially as specified.

20. In a stone-sawing machine, the slotted stone-clamp having a hook portion at one end and having its slot closed at the opposite end, a series of blocks adapted to be inserted through said slot, and a wedge or key also adapted to be driven through said slot, substantially as and for the purpose described.

21. In a stone-sawing machine, the saw-frame having slotted end bars, parallel screw-rods seated in opposite sides of the slots thereof, half-nuts adapted to engage the threads of said rods and also grooved to receive the saw-blades, substantially as described.

22. The saw-frame having a pair of parallel threaded rods at each end portion, a series of saws whose end portions are adapted to fit between the said rods, and half-nuts fitted to engage the said rods and also to engage the end portions of the saws, each of said end portions being held between a pair of said half-nuts, substantially as specified.

23. In a stone-sawing machine, the saw-frame having slotted or split end bars the slots whereof have laterally-offset grooves or recesses, a threaded rod seated in each of said recesses, and half-nuts fitted to engage the said rods and slotted to receive the end portion of the saw-blades, substantially as specified.

24. In a stone-sawing machine, the combination with the saw-frame having the slotted or split end bars the slots whereof are provided with opposite laterally-offset recesses, of the screw-rods seated in said recesses, the half-nuts engaging said rods and placed opposite to each other on each pair of the rods, and the saw-blades having thickened central portions whose ends engage grooves in the said nuts, said blades also having thinner portions at each side each of which is notched to form a saw, substantially as specified.

JAMES PECKOVER.

Witnesses:
 REBECCA O'BRIEN,
 CARRIE O'BRIEN.